Aug. 27, 1957 M. C. BISKEBORN 2,804,592
METHODS OF AND APPARATUS FOR MEASURING THE
CAPACITANCE OF AN INSULATED WIRE
Filed Sept. 3, 1953 2 Sheets-Sheet 1
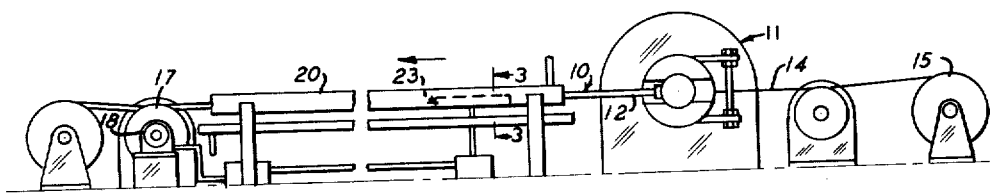
FIG. 1
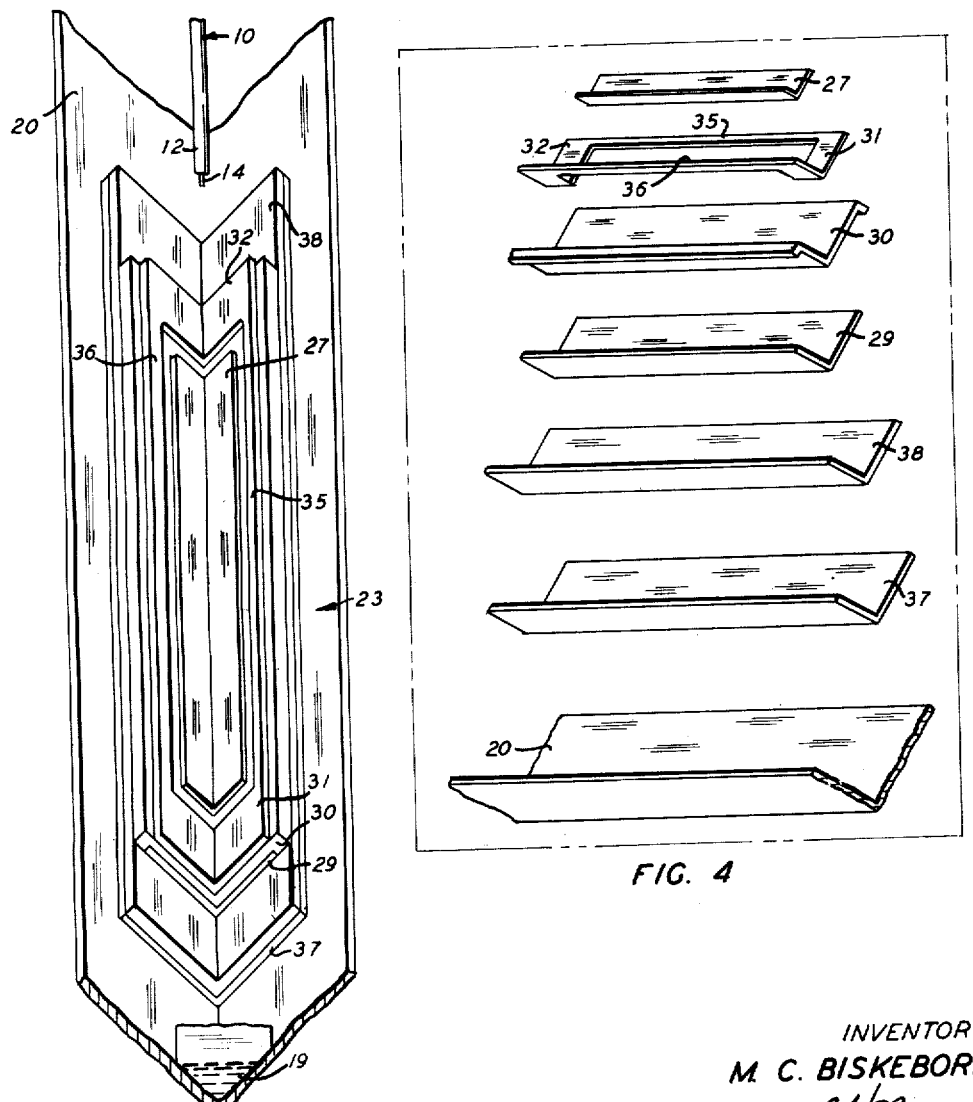
FIG. 2
FIG. 4
INVENTOR
M. C. BISKEBORN
BY
ATTORNEY

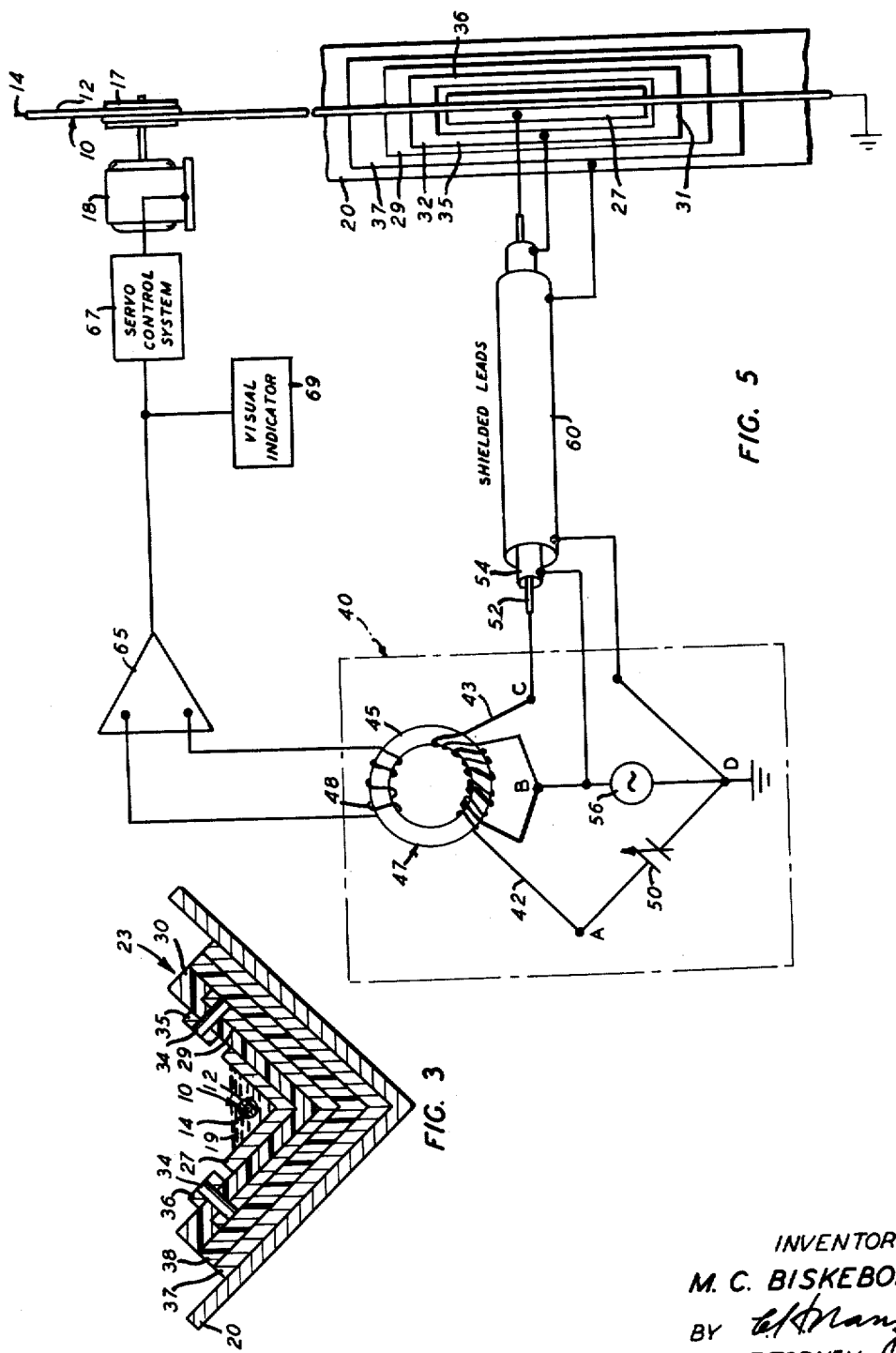

United States Patent Office 2,804,592
Patented Aug. 27, 1957

2,804,592

METHODS OF AND APPARATUS FOR MEASURING THE CAPACITANCE OF AN INSULATED WIRE

Merle C. Biskeborn, Baltimore, Md., assignor to Bell Telephone Laboratories, Incorporated, New York, N. Y., a corporation of New York Application September 3, 1953, Serial No. 378,330

18 Claims. (Cl. 324—61)

This invention relates to methods of and apparatus for measuring the capacitance of an insulated wire, and more particularly to methods of and apparatus for continuously monitoring the unit length capacitance of a wire being insulated with a covering of an extruded plastic.

In the manufacture of telephone cables containing a multiplicity of pairs of individually insulated wires, capacitance uniformity in the finished cable is a prime consideration. The capacitance unbalance to ground, or difference in direct capacitances of the wires of a pair to ground, is an indication of the susceptibility of cable circuits to noise and interference. It is desirable that the two wires of a pair in a cable possess substantially equal capacitance with respect to the surrounding pairs of the cable and the metallic cable sheath.

In the past insulated wires have been manufactured by extruding coverings of solid thermoplastic materials around conductors. Attempts have been made to keep the capacitance to ground of such insulated conductors at a predetermined value by maintaining the diameter of the insulation within close limits. However, this procedure has not been entirely satisfactory because the dielectric constant of the plastic insulation itself may vary due to variations in its composition or other causes. Also, it is possible to produce insulation having a substantially constant diameter without maintaining the capacitance to ground within the desired limits, because the insulating covering may be eccentric with respect to the wire which it surrounds.

Recently attempts have been made to insulate conductors with expanded plastics, one of the most promising of which is cellular polyethylene. In the manufacture of such insulation, the problem of maintaining a predetermined uniform capacitance to ground of an insulated wire is further complicated by random variations in the composite dielectric constant of the extruded insulation which occur during the extrusion process. These variations may result from changes in the degree of expansion of the cellular plastic insulation, which is difficult to control because of changes in the temperatures and other factors in the extrusion process.

It has been found that the production of either solid or cellular plastic insulated wire having a substantially uniform predetermined capacitance to ground may be achieved by continuous automatic control of the extruder. One method which has proved satisfactory involves the continuous automatic control of the extruder in accordance with continuous information on the capacitance of successive equal-lengths of the finished product as it leaves the extruder. Methods and apparatus for carrying out such a control are described fully and claimed in copending application, Serial No. 378,298, filed September 3, 1953, by G. E. Henning and A. S. Windeler.

Manifestly, the precision of the above process control depends primarily upon the accuracy of the continuous capacitance information. To achieve this requirement, there is needed capacitance sensing apparatus capable of continuously measuring the unit length capacitance of the continuously advancing insulated wire, and also capable of continuously indicating variations in the measured unit length capacitance of the insulated wire from a predetermined standard.

It is an object of this invention to provide new and improved methods of and apparatus for measuring the capacitance of an insulated wire.

Another object of this invention is to provide new and improved methods of and apparatus for continuously monitoring the unit length capacitance of a wire being insulated with an extruded plastic covering.

A method illustrating certain features of the invention may include the steps of submerging an insulated wire in a body of an electroconductive liquid, electrically isolating a column of the liquid surrounding a predetermined length of the insulated wire, applying an alternating electrical potential between the isolated liquid column and the submerged wire, and measuring the capacitance between the liquid column and the wire.

Apparatus illustrating certain features of the invention may include an electrode adjacent to which an insulated wire may be positioned, means for maintaining a column of conductive liquid within the electrode so as to submerge a wire so positioned, and means for applying an alternating potential between the electrode and the wire whereby there is formed a condenser in which the dielectric is the insulation on the wire.

These and other objects and features of the invention will be apparent from the following description of a specific embodiment of the invention, when read in conjunction with the accompanying drawings, in which:

Fig. 1 is a side elevation of apparatus for extruding plastic materials, with parts thereof broken away;

Fig. 2 is an enlarged, fragmentary view of a cooling trough having an electrode assembly positioned therein, the trough being viewed from above at an angle looking along the trough;

Fig. 3 is an enlarged, vertical section taken along line 3—3 of Fig. 1;

Fig. 4 is an exploded view showing various elements of the electrode assembly and the cooling trough; and Fig. 5 is a schematic diagram of an electrical circuit forming part of the apparatus.

Referring now to Fig. 1, there is shown a conventional plastics extruding installation for the production of a plastic insulated wire 10. The installation includes a plastics extruder 11 for applying a concentric layer 12 of a thermoplastic insulation, such as solid or cellular polyethylene, or the like, onto a bare wire 14. The wire 14 is advanced continuously from a supply reel 15 through the extruder 11, by means of a takeup capstan 17 driven by a motor 18.

Immediately after the insulated wire 10 emerges from a die orifice in the extruder 11, it enters a bath of cooling water 19 (Figs. 2 and 3) contained in an elongated, steel, V-shaped cooling trough 20 positioned between the extruder and the takeup capstan 17 in parallel alignment with the advancing wire. The water level in the trough is maintained substantially constant, by suitable supply means (not shown), at a height sufficient to insure that the insulated wire remains completely immersed in the water 19 along the entire length of the trough 20.

An electrode assembly 23 forming a part of a capacitance sensing unit rests on the sides of the trough 20. The electrode assembly 23 is located close to the extruder, but removed sufficiently therefrom to insure that the insulation has been cooled enough by the water in the trough 20 to prevent further substantial changes in the outer diameter or dielectric constant of the insulation.

As illustrated in Figs. 2, 3 and 4, the electrode assembly 23 includes an open-ended, V-shaped electrode 27 made of a sheet of copper. If desired, the electrode 27 may be made of any suitable conductive material, such as sheet brass, or the like. The electrode 27 is of a calculated length and is designed to nest within an elongated, open-ended, V-shaped guard 29, made of a similar conductive sheet material, which guard completely envelopes the outer surface of the electrode 27. The guard 29 is somewhat longer than the electrode 27 and extends a short distance beyond the ends of the electrode. Interposed between the nested electrode 27 and the guard 29 is an insulating spacer 30, formed by a layer of plastic insulation, such as polyethylene or the like, which serves to electrically insulate one from the other.

Positioned at the ends of the electrode 27 and spaced longitudinally therefrom are a pair of open-ended, V-shaped end guards 31 and 32 made of a conductive sheet of a material such as copper, brass or the like. The end guards 31 and 32 are nested within the guard 29 in alignment with the electrode 27 and are attached rigidly to the guard 29 by means of conductive metallic spacers 34—34, which serve to position the guards 31 and 32 in axail alignment with the electrode and to connect them electrically to the guard 29. The guards 31 and 32 are interconnected by a pair of longitudinally extending guard strips 35 and 36, which are disposed in spaced, parallel relationship to the respective edges of the longitudinal sides of the electrode 27. The guard strips 35 and 36 are likewise made of a conductive sheet material, such as copper, brass or the like.

The nested assembly of the electrode 27, the guard 29, the end guards 31 and 32, and the guard strips 35 and 36 are, in turn, nested within an elongated, open-ended, metallic, V-shaped, outer shield 37. The shield 37 is spaced from the guard 29 by an insulating spacer 38 formed from a plastic insulating material, such as polyethylene or the like, which serves to insulate the guard 29 electrically from the shield 37. When the V-shaped electrode assembly 23 is positioned properly in the cooling trough 20, the outer shield 37 rests on the sides of the cooling trough cradled between the converging trough sides, and the water in the trough flows over the electrode 27. The level of the water 19 contained in the cooling trough 20 is such that the electrode 27 is only partially covered by the water, as shown in Fig. 3. When the electrode is thus positioned and an insulated wire 10 is advanced therethrough, the wire 14 and the column of water in the electrode 27, which surrounds the insulated wire, form two coaxial plates of a condenser in which the dielectric is the covering 12 of insulating material.

Referring now to Fig. 5, there is shown an alternating current, impedance bridge, indicated generally at 40, comprising terminals A, B, C and D, respectively. The arms AB and BC of the bridge 40 include low impedance windings 42 and 43, respectively, which are exactly equal and nearly perfectly coupled. Such close coupling is due to the fact that the individual conductors of the windings 42 and 43 are closely spaced and bifilarly wound on a common toroidal core 45 made of a high permeability material, such as "Permalloy" powder.

The windings 42 and 43, in effect, constitute the center-tapped primary of a transformer 47 having a secondary winding 48, which is also wound about the toroidal core 45. As a result of the high degree of coupling between the windings 42 and 43, any impedance of reasonable size shunting either of the windings will have a negligible effect on the voltage induced in the secondary winding 48, which serves as the detector arm of the bridge 40.

Connected across the terminals A and D of the bridge 40, is a variable standard capacitance 50, and the terminal D is grounded. The electrode 27 is connected by a shielded electrical lead 52 to the terminal C of the bridge 40. The guard 29, the end guards 31 and 32, and the guard strips 35 and 36, are connected to the terminal B by a common shielded electrical lead 54. A low frequency oscillator 56, which serves as the power supply for the impedance bridge 40, is connected between terminals B and D. The shield 37 and the cooling trough 20 are grounded by a common connection through an electrical lead 60 to the grounded terminal D, and the bare wire 14 is likewise grounded.

The detector arm of the impedance bridge 40, which includes the secondary winding of the transformer 47 is connected to the input terminals of an amplifier, indicated schematically at 65. The amplifier 65 amplifies any unbalance voltages induced in the secondary winding 48, and feeds the amplified signal voltage to a servo-control system, indicated schematically at 67, which is operatively connected to the motor 18 which drives the take-up capstan 17, for the purpose of controlling the speed of rotation of the capstan, and thereby controlling the linear speed at which the conductor 14 is advanced through the extruder 11. A visual indicator (e. g. an oscilloscope), indicated schematically at 69, is provided for the purpose of indicating the direction and magnitude of the unbalance voltage resulting from an unbalanced bridge.

*Operation*

During the extruding operation, the bare wire 14 is advanced continuously through the extruder 11 by the takeup capstan 17. In the extruder the layer 12 of plastic insulation envelopes the wire 14 in the throat of the extruder die orifice to form the insulated wire 10. After the insulated wire 10 emerges from the extruder, it immediately enters the bath of cooling water 19 contained in the cooling trough 20. As the submerged wire 10 advances along the cooling trough 20, it moves through the nested electrode assembly 23 passing longitudinally between sides of the V-shaped electrode 27 and the V-shaped end guards 31 and 32.

The impedance bridge 40 is continuously energized by the oscillator 56, which operates at a frequency of about 10 kilocycles. As shown in Fig. 5, the guard 29, the end guards 31 and 32 and the guard strips 35 and 36, which are connected to the terminal B, are energized directly by the oscillator 56. By design, the impedance of the bridge arm BC has been made negligible as compared with the impedance of the arm CD, which in a practical case, for an electrode having a length of two feet, presents an impedance of approximately 150,000 ohms at 10 kilocycles. Hence, the vector potential of the electrode 27 is substantially equal to the vector potential of the guard 29, the end guards 31 and 32, and the guard strips 35 and 36. Thus, the longitudinal potential difference between the water column contacted by the electrode 27 and the water columns contacted by the guards 31 and 32 is effectively eliminated, since the end guards 31 and 32 raise their associated water columns to substantially the same potential as that on the electrode 27. As a result, the electrode 27 and its associated water column are effectively isolated longitudinally from the rest of the water in the grounded cooling trough 20. The guard 29, which is interposed between the electrode 27 and the grounded shield 37 on the outside of the electrode assembly and is operated at substantially the same vector potential as the electrode 27, prevents the electrode 27 from having capacitance to the grounded shield 37 on the grounded, metallic cooling trough 20.

The water supplied to the trough 20 is ordinary tap water, and is sufficiently conductive to meet the purposes of this invention. The water column lying within the electrode 27 is effectively isolated from the remaining water in the cooling trough 20, and serves as an outer, coaxial, conductive liquid sheath surrounding the periphery of the insulation 12 on the wire 14. For the purpose of the capacitance measurement, the effective length of this conductive liquid sheath formed by the water column in the electrode 27, is approximately equal to the length of the electrode plus one half of the sum of the lengths of the gaps between the electrode 27 and the end guards 31 and 32, respectively, since the end guards 31 and 32 eliminate substantially any fringing effects by establishing between the ends of the conductive liquid sheath and ground a voltage drop almost exactly equal to the potential applied to the central portion of the water column within the electrode. By design, the spacing of the end guards from the electrode 27 is small, and, hence, the effective length of the electrode may be assumed to be approximately its measured length. In effect, the conductive liquid sheath formed by the water column in the electrode 27 constitutes one plate of a coaxial electrical condenser in contact with a predetermined length of the insulation 12 on the wire 14 equal approximately to the length of the electrode. The grounded wire 14 forms the other plate of the condenser, with the insulation 12 on the wire constituting a dielectric separating the plate formed by the wire 14 from the outer coaxial plate formed by the conductive liquid sheath.

Since the guard strips 35 and 36 and the guard 29 interposed between the electrode 27 and the grounded shield 37 are energized at approximately the same potential as the electrode, there is effectively no capacitance between the electrode and the shield. Thus, the conductive water column contacted by the electrode 27 can have a direct capacitance $C_x$ only to the grounded conductor 14. The water provides such a high admittance path to ground between the electrode 27 and outer surface of the insulated wire 14 that the capacitance $C_x$ may be considered to be comprised entirely of the distributed capacitance of the portion of the insulated grounded conductor within the water column in the electrode 27. Thus, the value of the capacitance $C_x$ is determined by the dielectric properties and thickness of the successive lengths of plastic insulation lying instantaneously between the ends of the electrode.

As mentioned above, the impedance of the bridge arm BC may be considered to be negligible. This is largely due to the fact that when the bridge 40 is balanced and equal currents flow in the opposed low impedance windings 42 and 43, the magnetic flux in the common toroidal core 45 is zero. Manifestly, when the flux in the core 45 is zero, the impedance in each winding reduces simply to the resistance drop in the conductor of the winding, which is negligible. Capacitances $C_1$, $C_2$ and $C_3$ between the electrode 27 and the guard 29 and the end guards 31 and 32, respectively, have negligible voltage difference impressed between their terminals due to the approximately equipotentials of the electrode and guards and, therefore, disappear from the bridge network insofar as their effect on the balance of the bridge 40 is concerned. Since the oscillator 65 supplies power directly to the guard 29 and the end guards 31 and 32, the current flow from the guards through the water does not affect the bridge balance, and such currents are shunted entirely through the oscillator 56.

The capacitance $C_x$, which is determined by the dielectric properties and thickness of the plastic insulation surrounding a predetermined length of the conductor, is inserted into the bridge arm CD and continuously compared with the standard capacitance $C_s$ in the bridge arm AD. Manifestly, any difference between the measured capacitance $C_x$ and the standard capacitance $C_s$ produces an unbalanced condition in the impedance bridge and induces a signal voltage in the secondary winding 48 of the transformer 47. This signal voltage, which varies in magnitude and in phase with the amount and direction of the unbalance, is amplified by the amplifier 65 and is fed to the servo-control system 67 to adjust the speed of the motor 18, and of the capstan 17 driven thereby, so as to restore the balance in the bridge.

Variations in the speed of the capstan 17 change the linear speed of the wire as it moves through the extruder, and vary the thickness of the insulation to compensate for normal, uncontrollable changes in the dielectric constant of the plastic insulation in such a manner as to maintain the capacitance per unit length of the wire substantially constant. Although the capacitance between the wire 14 and the conductive water sheath surrounding the outer periphery of the insulation is not the same as the capacitance to ground in a cable, it is related so closely to it that a control of the first is effectively a control of the other.

It will be understood that the above-described apparatus is merely an exemplary embodiment of the invention. It is manifest that various modifications of this apparatus may be made without departing from the spirit and scope of the invention.

For example, the trough 20, as well as the electrode 27, the guard 29, the end guards 31 and 32 and the spacers 30 and 38 forming elements of the electrode assembly 23, may be made in the shape of a round bottom or square bottom U, instead of V-shaped, with satisfactory results.

If desired, the servo-control system may be associated with the motor driving the extrusion screw in the extruder 11 so that the speed of rotation of this screw, and therefore the rate of extrusion of the plastic insulation, will be varied in accordance with the capacitance measurements made by the capacitance sensing apparatus embodying the invention. Likewise, it is possible to control the temperatures in various parts of the extruder, or the relative positions of the sheath-forming elements in the extruder, to change the character and thickness of the extruded sheath of insulation in accordance with such measurements.

The foregoing description relates primarily to the insulation of wires with polyethylene in either solid or cellular form. However, it is obvious that apparatus embodying the invention may be used to monitor the unit length capacitance of wires insulated with other plastic insulating materials, such as polyvinyl chloride, copolymers of vinyl chloride and vinyl acetate, nylon, plasticized polystyrene, or the like, whether in solid or expanded form.

It will be understood that various electroconductive liquids other than water may be utilized.

What is claimed is:

1. The method of measuring the capacitance of an insulated wire, which comprises submerging an insulated wire in a body of an electroconductive liquid, electrically but physically isolating a column of said liquid surrounding a predetermined length of the insulated wire, applying an alternating electrical potential between said electrically isolated liquid column and the submerged wire, and measuring the capacitance between said liquid column and the wire.

2. The method of measuring the capacitance of an insulated wire, which comprises submerging an insulated wire in a body of electroconductive water, electrically but not physically isolating a column of said water surrounding a predetermined length of the insulated wire, applying an alternating electrical potential between said electrically isolated water column and the submerged wire, and measuring the capacitance between said water column and the wire.

3. The method of monitoring continuously the unit length capacitance of an insulated wire, which comprises continuously advancing an insulated wire through a body of an electroconductive liquid, electrically but not physically isolating a column of said liquid surrounding successive increments of the insulated wire of a predetermined length, applying an alternating electrical potential between said electrically isolated liquid column and the submerged wire, and measuring the capacitance between said liquid column and the wire.

4. The method of monitoring continuously the unit length capacitance of an insulated wire, which comprises continuously advancing an insulated wire through a body of an electroconductive liquid, electrically but not physically isolating a column of said liquid surrounding successive increments of the insulated wire of a predetermined length, applying an alternating electrical potential between said electrically isolated liquid column and the submerged wire, and comparing the capacitance between said electrically isolated liquid column and the wire with a standard capacitance.

5. Apparatus for measuring the capacitance of an insulated wire, which comprises a body of an electroconductive liquid in which the insulated wire may be submerged, means for electrically isolating a column of said body of electroconductive liquid surrounding a predetermined length of such a wire without physically separating said column from the remainder of the liquid body, means for applying an alternating electrical potential between said electrically isolated column of liquid and the wire submerged therein whereby there is formed a condenser in which the dielectric is the insulation on the wire, and means for measuring the capacitance of said condenser.

6. Apparatus for measuring the capacitance of an insulated wire, which comprises a body of an electroconductive liquid in which the insulated wire may be submerged, an electrode submerged in the liquid body adjacent to such a submerged wire, means for electrically isolating the electrode and the portion of the liquid body lying therewithin without physically separating said portion from the remainder of the liquid body, means for applying an alternating voltage between the electrode and the wire, and means for measuring the capacitance between the electrode and the wire.

7. Apparatus for measuring the capacitance of an insulated wire, which comprises a body of electroconductive water in which the insulated wire may be submerged, an electrode submerged in the water adjacent to such a submerged wire, means for electrically isolating the electrode and the portion of the water lying therewithin without physically separating said portion from the remainder of the body of water, means for applying an alternating voltage between the electrode and the wire, and means for measuring the capacitance between the electrode and the wire.

8. Apparatus for measuring the capacitance of an insulating plastic covering on a wire, which comprises a column of a conductive liquid in which the insulated wire may be submerged, an open-ended, trough-shaped electrode partially submerged in the liquid column so as to partially surround such a submerged wire, guard means for electrically isolating the electrode and the portion of the liquid column lying within the electrode, means for applying an alternating voltage between the conductive core of the wire and the electrode, and means for measuring the capacitance between the conductive core of the insulated wire and the electrode.

9. Apparatus for measuring the capacitance of an insulating plastic covering on a wire, which comprises a column of water in which the insulated wire may be submerged, an open-ended, trough-shaped electrode partially submerged in the water column so as to partially surround such a submerged wire, guard means for electrically isolating the electrode and the portion of the water column lying within the electrode, means for applying an alternating voltage between the conductive core of the wire and the electrode, and means for measuring the capacitance between the conductive core of the wire and the electrode.

10. Apparatus for measuring the capacitance of a plastic covered wire, which comprises a trough-shaped electrode within which such a wire may be positioned, means for maintaining a column of water in the electrode of sufficient depth to submerge a wire so positioned, means for applying an alternating voltage between the electrode and the wire to form a condenser in which the plastic covering is the dielectric, means for electrically isolating the electrode and the water column from all other conductors, and means for measuring the capacitance between the electrode and the wire.

11. Apparatus for measuring the capacitance of a plastic insulated wire of indefinite length, which comprises an open-ended, trough-shaped electrode, means for continuously advancing such an insulated wire longitudinally through the electrode, means for maintaining a column of electroconductive liquid in the electrode of sufficient depth to submerge an insulated wire advancing through the electrode, means for applying an alternating voltage between the wire and the electrode, guards for electrically isolating the electrode and the column of conductive liquid from all other conductors, and means for continuously measuring the capacitance between the electrode and successive increments of the advancing wire passing through the electrode.

12. Apparatus for measuring the capacitance of a plastic insulated wire of indefinite length, which comprises an open-ended, trough-shaped electrode, means for continuously advancing such an insulated wire longitudinally through the electrode, means for maintaining a column of water in the electrode of sufficient depth to submerge an insulated wire advancing through the electrode, means for applying an alternating voltage between the wire and the electrode, guards for electrically isolating the electrode and the column of water, and means for continuously measuring the capacitance between the electrode and successive increments of the advancing wire passing through the electrode.

13. Apparatus for measuring continuously the capacitance of an insulated wire advancing continuously through a cooling trough containing water, which comprises an open-ended, trough-shaped electrode partly submerged in the water and positioned so that the wire passes longitudinally between the sides thereof beneath the surface of the column of water therein, a pair of open-ended, trough-shaped guard elements positioned at opposite ends of the electrode in axial alignment with and spaced longitudinally from the ends of the electrode, an outer open-ended, trough-shaped guard member within which the electrode and guard elements are nested, insulating material electrically insulating the electrode from said guard member, an open-ended, trough-shaped shield within which the guard member is nested, insulating material electrically insulating the guard member from said shield, means for applying an alternating voltage between the electrode and the wire, means for applying to the guard elements and the guard member an alternating voltage substantially equal to the vector voltage impressed on the electrode, and means for measuring the capacitance between the electrode and the wire.

14. Apparatus for measuring continuously the capacitance of an insulated wire advancing continuously through a cooling trough containing water, which comprises an open-ended, trough-shaped electrode partly submerged in the water and positioned so that the wire passes longitudinally between the sides thereof beneath the surface of the column of water therein, an open-ended, trough-shaped electrode, a pair of open-ended, trough-shaped guard elements positioned at opposite ends of the electrode in axial alignment with and spaced longitudinally from the ends of the electrode, an outer open-ended, trough-shaped guard member within which the electrode, guard elements and guard strips are nested, a pair of guard strips disposed in spaced parallel relationship with respect to the respective longitudinal edges of the electrode, a layer of insulating material electrically insulating the electrode from said guard member, an open-ended, trough-shaped shield within which the guard member is nested, insulating material electrically insulating the guard member from said shield, means for applying an alternating voltage between the electrode and the wire, means for applying to the guard elements, the guard strips and the guard member an alternating voltage substantially equal to the vector voltage impressed on the electrode, and means for measuring the capacitance between the electrode and the wire.

15. In an extrusion apparatus for applying a continuous covering of plastic insulation upon a central, filamentary, conductive core to form an insulated wire, including means for advancing the finished insulated wire continuously through a bath of cooling water contained in an elongated trough, an improved apparatus for monitoring continuously the unit length capacitance of the insulated wire, which comprises an open-ended, trough-shaped electrode submerged partly in the water and positioned so that the wire is submerged in the water and passes longitudinally between the sides of the electrode, guard means for electrically isolating the electrode and the column of water lying therewithin from the remainder of the water, and an impedance bridge circuit comprising a toroidal core, a pair of low impedance windings bifilarly wound upon the toroidal core forming two adjacent arms of the bridge circuit, a standard capacitor forming a third arm of the bridge circuit, circuit means electrically connected to the electrode and the conductive core of the wire, respectively, whereby the impedance between said electrode and the conductive core of said wire forms the fourth arm of the bridge circuit, a secondary winding on the toroidal core and a power supply for energizing the bridge circuit.

16. In an extrusion apparatus for applying a continuous covering of plastic insulation upon a central, filamentary, conductive core to form an insulated wire, including means for advancing the finished insulated wire continuously through a bath of cooling water contained in an elongated trough, an improved apparatus for monitoring continuously the unit length capacitance of the insulated wire, which comprises an open-ended, trough-shaped electrode submerged partly in the water and positioned so that the wire is submerged in the water and passes longitudinally between the sides of the electrode, guard means for electrically isolating the electrode and the column of water lying therewithin from the remainder of the water, and an impedance bridge circuit comprising a toroidal core, a pair of substantially equal, low impedance windings bifilarly wound upon the toroidal core forming two adjacent arms of the bridge circuit, a standard capacitor forming a third arm of the bridge circuit, circuit means electrically connected to the electrode and the conductive core of the wire, respectively, whereby the capacitance between said electrode and the conductive core of said wire forms the fourth arm of the bridge circuit, a secondary winding on the toroidal core and an oscillator for energizing the bridge circuit, said oscillator being connected at one terminal to the junction between the bifilarly wound windings and at its other terminal to the junction between the third and fourth arms of the bridge circuit, whereby unbalance voltages are induced in the secondary winding on the toroidal core whenever the capacitance between the electrode and the conductive core of the wire varies from the standard capacitance.

17. In an extrusion apparatus for applying a continuous covering of plastic insulation upon a central, filamentary, conductive core to form an insulated wire, including means for advancing the finished insulated wire continuously through a bath of cooling water contained in an elongated trough, an improved apparatus for monitoring continuously the unit length capacitance of the insulated wire, which comprises an open-ended, trough-shaped electrode submerged partly in the water and positioned so that the wire is submerged in the water and passes longitudinally between the sides of the electrode, guard means for electrically isolating the electrode and the column of water lying therewithin from the remainder of the water, and an impedance bridge circuit comprising a toroidal core, a pair of substantially equal, low impedance windings bifilarly wound upon the toroidal core forming two adjacent arms of the bridge circuit, a standard capacitor forming a third arm of the bridge circuit, circuit means electrically connected to the electrode and the conductive core of the wire, respectively, whereby the capacitance between said electrode and the conductive core of said wire forms the fourth arm of the bridge circuit, said wire being connected directly to ground at the junction between the third and fourth arms of the bridge circuit, circuit means connecting the guard elements directly to the junction between the bifilarly wound winding, an oscillator having one terminal connected directly to the guard elements and the other terminal grounded, and a secondary winding of the toroidal core for detecting unbalance voltages induced as a result of variations between the standard capacitance and the capacitance between the electrode and the conductive core of the wire.

18. Apparatus for measuring the capacitance of an insulated wire, which comprises a body of an electroconductive liquid in which the insulated wire may be submerged, means for electrically isolating a column of said body of electroconductive liquid surrounding a predetermined length of such a wire without physically separating said column from the remainder of said liquid body, means for applying an alternating electrical potential between said electrically isolated column of liquid and the wire submerged therein whereby there is formed a condenser in which the dielectric is the insulation on the wire, a standard capacitance, and means for comparing the capacitance of said condenser with said standard capacitance.

References Cited in the file of this patent

UNITED STATES PATENTS

| | | |
|---|---|---|
| 1,897,330 | Pender | Feb. 14, 1933 |
| 1,984,166 | Walter | Dec. 11, 1934 |
| 2,238,610 | Thomas | Apr. 15, 1941 |
| 2,476,496 | Kliever | July 19, 1949 |
| 2,588,882 | Rolfson | Mar. 11, 1952 |

UNITED STATES PATENT OFFICE

CERTIFICATE OF CORRECTION

Patent No. 2,804,592                                        August 27, 1957

Merle C. Biskeborn

It is hereby certified that error appears in the printed specification of the above numbered patent requiring correction and that the said Letters Patent should read as corrected below.

Column 3, line 34, for "are" read -- is --; column 4, line 65, for "on" read -- or --; column 6, line 45, after "but" insert -- not --.

Signed and sealed this 21st day of January 1958.

(SEAL)
Attest:

KARL H. AXLINE
Attesting Officer

ROBERT C. WATSON
Commissioner of Patents